US012795650B2

(12) United States Patent
Koskinen et al.

(10) Patent No.: US 12,795,650 B2
(45) Date of Patent: Nov. 10, 2026

(54) SELECTION MECHANISM AND USE OF MULTIPLE UL TRANSMISSION SCHEMES

(71) Applicant: NOKIA TECHNOLOGIES OY, Espoo (FI)

(72) Inventors: Jussi-Pekka Koskinen, Oulu (FI); Samuli Heikki Turtinen, Li (FI)

(73) Assignee: NOKIA TECHNOLOGIES OY, Espoo (FI)

(*) Notice: Subject to any disclaimer, the term of this patent is extended or adjusted under 35 U.S.C. 154(b) by 568 days.

(21) Appl. No.: 18/040,623

(22) PCT Filed: May 6, 2021

(86) PCT No.: PCT/EP2021/061989
§ 371 (c)(1),
(2) Date: Feb. 3, 2023

(87) PCT Pub. No.: WO2021/228676
PCT Pub. Date: Nov. 18, 2021

(65) Prior Publication Data

US 2023/0300831 A1 Sep. 21, 2023

Related U.S. Application Data

(60) Provisional application No. 63/023,326, filed on May 12, 2020.

(51) Int. Cl.
*H04W 72/1268* (2023.01)
*H04W 74/0833* (2024.01)
(Continued)

(52) U.S. Cl.
CPC ... *H04W 72/1268* (2013.01); *H04W 74/0833* (2013.01); *H04W 76/19* (2018.02); *H04W 76/20* (2018.02); *H04W 74/0836* (2024.01)

(58) Field of Classification Search
None
See application file for complete search history.

(56) References Cited

U.S. PATENT DOCUMENTS

2019/0037447 A1 1/2019 Lee et al.
2020/0322926 A1 10/2020 Ly et al.
(Continued)

FOREIGN PATENT DOCUMENTS

WO WO 2019/132234 A 7/2019
WO WO 2019/217829 A1 11/2019
(Continued)

OTHER PUBLICATIONS

International Search Report and Written Opinion for Patent Cooperation Treaty Application No. PCT/EP2021/061989 dated Sep. 3, 2021, 12 pages.
(Continued)

*Primary Examiner* — Anh Vu H Ly
(74) *Attorney, Agent, or Firm* — Alston & Bird LLP

(57) ABSTRACT

Apparatuses and methods are disclosed. A method, comprising: by a user equipment in an inactive or idle state and in response to having uplink data that is to be transmitted, selecting which one of multiple uplink transmission schemes should be used to transmit the uplink data, wherein the multiple uplink transmission schemes comprise a regular connection establishment, a small data transmission, or a preconfigured grant; and performing the selected uplink transmission scheme to transmit the uplink data.

19 Claims, 4 Drawing Sheets

(51) Int. Cl.

| | |
|---|---|
| ***H04W 76/19*** | (2018.01) |
| ***H04W 76/20*** | (2018.01) |
| *H04W 74/0836* | (2024.01) |

(56) References Cited

U.S. PATENT DOCUMENTS

| | | | | |
|---|---|---|---|---|
| 2020/0383085 | A1* | 12/2020 | Shih .................. | H04W 74/0833 |
| 2021/0014864 | A1* | 1/2021 | Phuyal .................. | H04W 72/53 |
| 2021/0014926 | A1 | 1/2021 | Xu et al. | |
| 2021/0259040 | A1 | 8/2021 | Babaei | |
| 2021/0274563 | A1* | 9/2021 | Wong .................... | H04W 68/02 |
| 2021/0314925 | A1 | 10/2021 | Shin et al. | |
| 2022/0007391 | A1 | 1/2022 | Höglund et al. | |
| 2022/0167452 | A1 | 5/2022 | Chang et al. | |
| 2022/0167457 | A1* | 5/2022 | Bhatoolaul ........... | H04W 76/27 |
| 2022/0248493 | A1 | 8/2022 | Kim et al. | |
| 2022/0286355 | A1 | 9/2022 | Park et al. | |
| 2023/0141487 | A1* | 5/2023 | Chin ................. | H04W 52/0235 370/328 |

FOREIGN PATENT DOCUMENTS

| | | | |
|---|---|---|---|
| WO | WO 2020/065619 | A1 | 4/2020 |
| WO | 2020/092415 | A1 | 5/2020 |
| WO | WO 2021/170134 | A1 | 9/2021 |

OTHER PUBLICATIONS

Ericsson, "General PUR Procedure", 3GPP TSG-RAN WG2 #107, R1-1910436, (Aug. 26-30, 2019), 16 pages.

ZTE Corporation, "Work IEM on NR Small Data Transmissions in Inactive State", 3GPP TSG RAN Meeting #86, RP-193252, (Dec. 9-12, 2019), 4 pages.

"3rd Generation Partnership Project; Technical Specification Group Radio Access Network; Evolved Universal Terrestrial Radio Access (E-UTRA); Radio Resource Control (RRC); Protocol specification (Release 16)", 3GPP TS 36.331 v16.0.0, (Mar. 2020), 1114 pages.

"3rd Generation Partnership Project; Technical Specification Group Radio Access Network; NR; User Equipment (UE) procedures in Idle mode and RRC Inactive state (Release 16)", 3GPP TS 38.304 v16.0.0, (Mar. 2020), 38 pages.

Office Action for ARIPO Application No. AP/P/2023/014775 dated Sep. 15, 2025, 4 pages.

Office Action for European Application No. 21724269.2 dated Oct. 13, 2025, 7 pages.

Decision to Grant for ARIPO Application No. AP/P/2023/014775 dated Jan. 22, 2026, 4' 1 pages.

Examination Report for Australian Application No. 2021270820 dated Apr. 15, 2026, 5 pages.

Huawei et al., "Feature lead summary of Support for transmission in preconfigured UL resources", 3GPP TSG RAN WG1 Meeting #95, R1-1813717, (Nov. 12-16, 2018), 20 pages.

Nokia et al., "Transmission in preconfigured UL resources", 3GPP TSG RAN WG1 Meeting #95, R1-1812929, (Nov. 12-16, 2018), 5 pages.

Written Opinion for Singapore Application No. 11202300743S dated Dec. 10, 2025, 11 pages.

Examination Report for Australian Application No. 2021270820 dated Jul. 27, 2026, 3 pages.

Office Action for Canadian Application No. 3,188,564 dated May 29, 2026, 5 pages.

Office Action for Indonesian Application No. P00202302423 dated Jun. 17, 2026, 8 pages.

* cited by examiner

SELECTION MECHANISM AND USE OF MULTIPLE UL TRANSMISSION SCHEMES

CROSS-REFERENCE TO RELATED APPLICATIONS

This application is a national phase entry of International Application No. PCT/EP2021/061989, filed May 6, 2021, which claims benefit of U.S. Provisional Application No. 63/023,326, filed May 12, 2020, the contents of which are hereby incorporated by reference in their entirety.

TECHNICAL FIELD

Example embodiments relate to data communication in wireless networks by user equipment starting in an inactive or idle state. Further embodiments relate to sending data by the user equipment when starting from the inactive state or idle state.

BACKGROUND

In Long Term Evolution (LTE), a User Equipment (UE) had two states, idle and connected. The transition from the idle to the connected state results in a time delay. Initially, this was not a problem, since UEs originally connected to the network for reasons that typically involved a lot of data, such as voice, pictures, or video Over time, however, the time delay for the transition from the idle to the connected state became an issue. This is particularly true if the amount of data is small. For instance, a UE could be a sensor or include an app for a sensor, such as one that measures temperature. As another example, instant messaging services became popular, which need small amounts of data to be transferred.

To address this, the inactive (or INACTIVE) state was created. The inactive state is a state in which the UE can more quickly return to a connected (or CONNECTED) state, as compared to moving from an idle (or IDLE) state to a connected state. Certain techniques help with this process, including both the UE and the wireless network storing information to allow the connected state to be implemented more quickly.

For instance, it has been agreed to introduce transmission of uplink (UL) data on preconfigured Physical Uplink Shared Channel (PUSCH) resources (i.e., reusing the configured grant type 1 in the INACTIVE state). Such resources can be configured for the UE using dedicated signaling. Because the resources are preconfigured, the UE no longer has to ask for and receive resources for at least one UL transmission. In addition, it has been agreed to introduce UL small data transmissions for RACH-based schemes (i.e., 2-step and 4-step Random Access Channel, RACH, procedures) which could be configured to the UE using both dedicated and broadcast signaling. The 4-step RACH procedure is a longer procedure, and the 2-step procedure has been introduced to lessen the time it takes for a UE to connect to the network, i.e., for these small data transmissions. These procedures, particularly the 2-step procedure, allow the UE to send small data more quickly for UL transmissions.

Regardless, there are still potential issues with this process that might be improved.

DETAILED DESCRIPTION OF THE DRAWINGS

Figure 1:
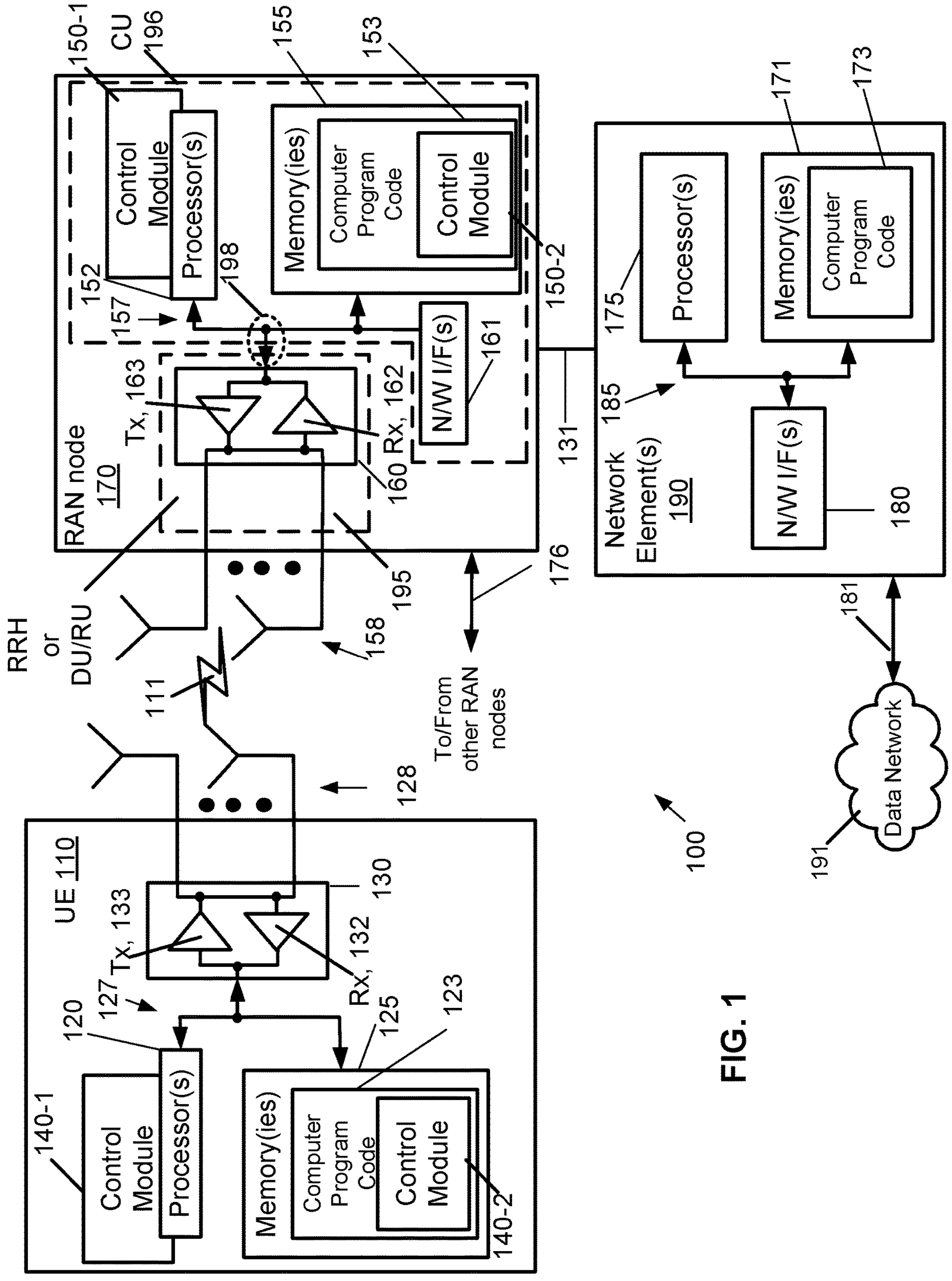
FIG. 1 is a block diagram of one possible and non-limiting exemplary system in which the exemplary embodiments may be practiced.

Abbreviations that may be found in the specification and/or the drawing figures are defined below, at the end of the detailed description section.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The exemplary embodiments herein describe techniques implementing a selection mechanism and use of multiple UL transmission schemes such as SDT or PCG. Additional description of these techniques is presented after a system into which the exemplary embodiments may be used is described.

Turning to FIG. 1, this figure shows a block diagram of one possible and non-limiting exemplary system in which the exemplary embodiments may be practiced. A user equipment (UE) 110, radio access network (RAN) node 170, and network element(s) 190 are illustrated. In FIG. 1, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a control module 140, comprising one of or both parts 140-1 and/or 140-2, which may be implemented in a number of ways. The control module 140 may be implemented in hardware as control module 140-1, such as being implemented as part of the one or more processors 120. The control module 140-1 may be implemented also as an integrated circuit or through other hardware such as a programmable gate array. In another example, the control module 140 may be implemented as control module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 is a base station that provides access for wireless devices such as the UE 110 to the wireless network 100. The RAN node 170 may be, for instance, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE, and connected via the NG interface to a 5GC (e.g., the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by one gNB-DU. The gNB-DU terminates the F1 interface 198 connected with the gNB-CU. Note that the DU 195 is considered to include the transceiver 160, e.g., as part of an RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a control module 150, comprising one of or both parts 150-1 and/or 150-2, which may be implemented in a number of ways. The control module 150 may be implemented in hardware as control module 150-1, such as being implemented as part of the one or more processors 152. The control module 150-1 may be implemented also as an integrated circuit or through other hardware such as a programmable gate array. In another example, the control module 150 may be implemented as control module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the control module 150 may be distributed, such as being distributed between the DU 195 and the CU 196, or be implemented solely in the DU 195.

The one or more network interfaces 161 communicate over a network such as via the links 176 and 131. Two or more RAN nodes 170 communicate using, e.g., link 176. The link 176 may be wired or wireless or both and may implement, e.g., an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, e.g., fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that the base station that forms the cell will perform the functions. The cell makes up part of a base station. That is, there can be multiple cells per base station. For instance, there could be three cells for a single carrier frequency and associated bandwidth, at least one cell covering one-third of a 360 degree area so that the single base station's coverage area covers an approximate oval or circle. Furthermore, at least one cell can correspond to a single carrier and a base station may use multiple carriers. So, if there are three 120 degree cells per carrier and two carriers, then the base station has a total of 6 cells.

The wireless network 100 may include a network element or elements 190 that may include core network functionality, and which provides connectivity via a link or links 181 with a data network 191, such as a telephone network and/or a data communications network (e.g., the Internet). Such core network functionality for 5G may include access and mobility management function(s) (AMF(s)) and/or user plane functions (UPF(s)) and/or session management function(s) (SMF(s)). Such core network functionality for LTE may include MME (Mobility Management Entity)/SGW (Serving Gateway) functionality. These are merely exemplary functions that may be supported by the network element(s) 190, and note that both 5G and LTE functions might be supported. The RAN node 170 is coupled via a link 131 to a network element 190. The link 131 may be implemented as, e.g., an NG interface for 5G, or an Si interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, vehicles with a modem device for wireless V2X (vehicle-to-everything) communication, image capture devices such as digital cameras having wireless communication capabilities, gaming devices having wireless communication capabilities, music storage and playback appliances having wireless communication capabilities, Internet appliances (including Internet of Things, IoT, devices) permitting wireless Internet access and possibly browsing, IoT devices with sensors and/or actuators for automation applications with wireless communication tablets with wireless communication capabilities, as well as portable units or terminals that incorporate combinations of such functions.

Having thus introduced one suitable but non-limiting technical context for the practice of the exemplary embodiments, the exemplary embodiments will now be described with greater specificity.

As stated above, the inactive state was created to reduce the time delay between transitioning from a state where the UE cannot transmit or receive to a state where the UE can transmit or receive. There are UL small data transmissions for RACH-based schemes (i.e. 2-step and 4-step RACH), which are referred to as Small Data Transmission (SDT) herein. There are schemes where there are transmissions of UL data on preconfigured PUSCH resources (i.e. reusing the configured grant type 1)—when TA is valid, these are referred to as Preconfigured Grant (PCG) herein.

It has been agreed to introduce transmission of UL data on preconfigured PUSCH resources (i.e., reusing the configured grant type 1 in an INACTIVE state). Such resources can be configured for the UE using dedicated signaling. In addition, it has been agreed to introduce UL small data transmissions for RACH-based schemes (i.e. 2-step and 4-step RACH), which could be configured to the UE using both dedicated and broadcast signaling.

For instance, transmissions using PUR (Periodic Uplink Resources) allow one uplink data transmission using a preconfigured uplink resource from the RRC IDLE mode. This is a scheduled technique, which may use PCGs. Another example is EDT (Early Data Transmission), which in certain instances allows one uplink data transmission optionally followed by one downlink data transmission during the random-access procedure.

One problem is that when both PCG and SDT have been configured for the UE at substantially the same time, it is not clear which UL transmission scheme the UE should use in different scenarios. In addition, it should be clear when the UE is allowed to perform PCG and SDT transmission. The exemplary embodiments herein are focused on defining a mechanism for smart selection of the UL transmission scheme.

Consequently, one exemplary purpose herein is to define a mechanism for selection of the proper UL transmission scheme in different scenarios.

In one embodiment, the UE 110 is allowed to use SDT and/or PCG when the UE is allowed to perform relaxed RRM measurements. Additionally, both relaxation conditions (i.e. low mobile condition or cell edge condition) could be considered, for example, as follows.

1) A low mobility condition may be used for determining whether SDT and/or PCG is allowed. In particular, if the UE has low mobility, the UE may be allowed to use SDT and/or PCG. Low mobility is a case there are very infrequent mobility events, e.g., handovers. This could be determined by the network by implementation or by the UE, e.g., by means of a timer since the previous handover.
2) A cell edge condition may be used for determining whether SDT and/or PCG is allowed. For instance, if the UE is determined to not be at a cell edge, such as meeting a cell edge condition indicating the UE is not at the cell edge, the UE may be allowed to use SDT and/or PCG.

In another exemplary embodiment, the UE 110 uses a regular connection establishment (e.g., RRC Setup/Resume) procedure if a PCG transmission occasion is more than a time threshold ahead. The time threshold can be, e.g., time in seconds, frames, subframes, slots, TTIs, or the like.

In the following exemplary embodiments from (a) to (d), it is assumed that both SDT and PCG are configured for the UE.

a) In one embodiment, the UE uses SDT if a PCG transmission occasion is more than a time threshold ahead. The time threshold can be, e.g., time in seconds, frames, subframes, slots, TTIs, or the like.
b) In another embodiment, the UE uses PCG if PCG transmission occasion is less than a time threshold ahead. The time threshold can be, e.g., time in seconds, frames, subframes, slots, TTIs, or the like.
c) In a further exemplary embodiment, the UE uses SDT instead of PCG. This could be in case, e.g., where the UE is explicitly configured with SDT but the PCG is available, for instance, through system information broadcast. Hence, the SDT takes precedence in this case.
d) Alternatively, in another embodiment, the UE uses PCG instead of SDT. This could be in case, e.g., where the UE is explicitly configured with PCG but the SDT is available, for instance, through system information broadcast. Hence, the PCG takes precedence in this case. In one option, this can be conditioned for SDT being configured via system information, i.e., if SDT is not configured by dedicated signaling, the UE uses PCG (if so configured) and does not use SDT. Other options are possible, as described below.

In one embodiment, the network should not configure both SDT and PCG at substantially the same time for the UE. In another exemplary embodiment, the UE releases its PCG configuration if the UE performs SDT transmission. Alternatively, the UE releases its SDT configuration if the UE performs PCG transmission.

Any other additional conditions for PCG and/or SDT transmission should not be precluded.

Figure 2:
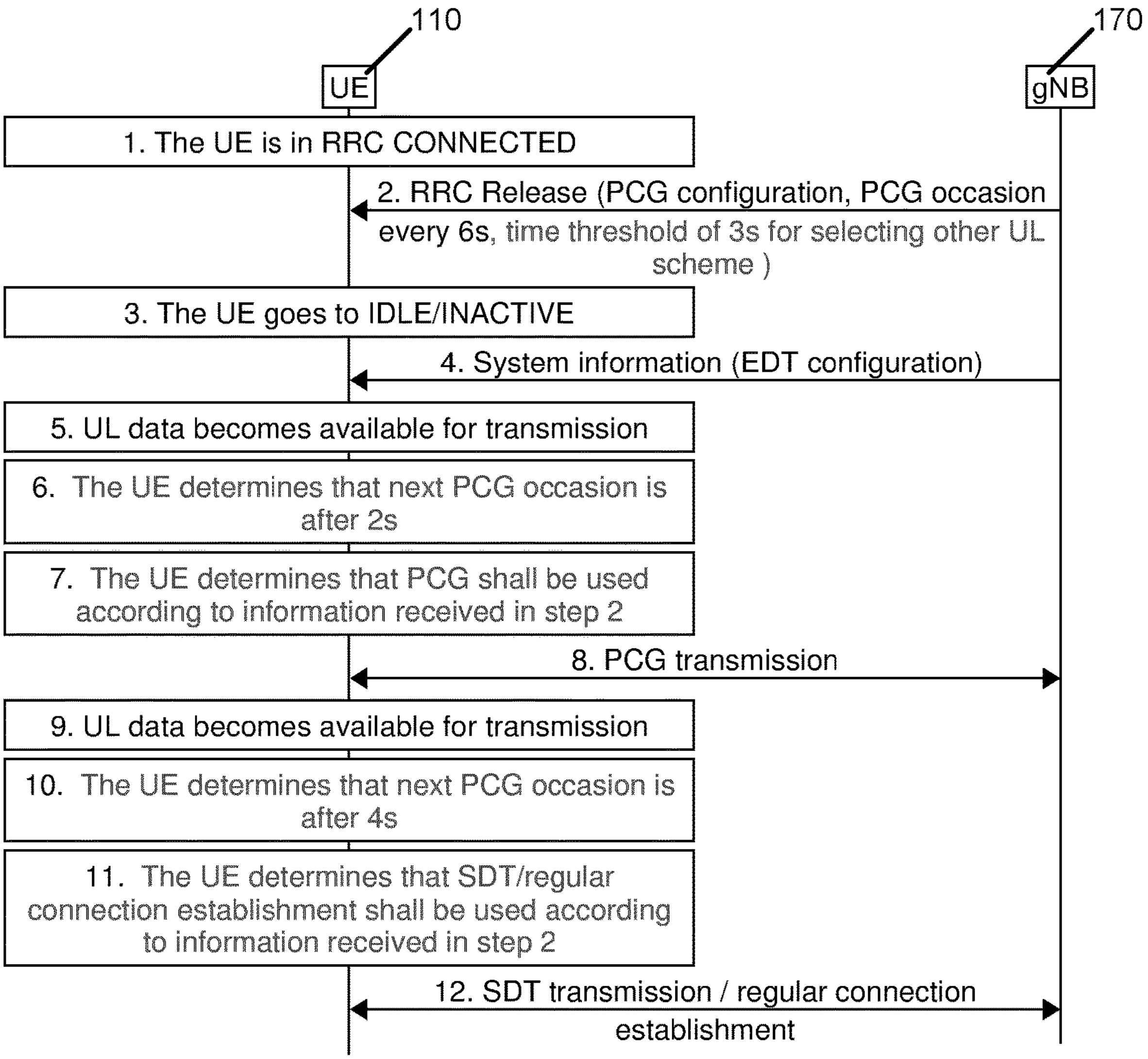
FIG. 2 is a signaling diagram of a process implementing an exemplary PCG and SDT selection mechanism and use.

Turning to FIG. 2, this figure is a signaling diagram of a process implementing an exemplary PCG and SDT selection mechanism and use. This example uses a gNB as RAN node 170, though this is not limiting. This figure also illustrates the operation of an exemplary method or methods, a result of execution of computer program instructions embodied on a computer readable memory, functions performed by logic implemented in hardware, and/or interconnected means for performing functions in accordance with exemplary embodiments. The UE 110 performs the operations and signaling in FIG. 2 under control of the control module 140, while the gNB 170 performs the operations and signaling in FIG. 2 under control of the control module 150.

In step 1, the UE is in the RRC CONNECTED state. Note also that the terms "state" and "mode" are often used interchangeably for these, such that the CONNECTED state and the CONNECTED mode are substantially the same. In step 2, the gNB 170 sends an RRC Release message comprising indications of a PCG configuration, PCG occasion of 6s (six seconds), a time threshold of 3s (three seconds) for selecting another UL scheme. This means PCG occasions are spaced apart by six seconds. Additionally, there is a time threshold of three seconds for selecting another UL scheme. That is, if the current time is three seconds or longer away from a PCG occasion, an SDT process establishment may be performed.

In step 3, the UE 110 goes to an idle/inactive state. In IDLE mode, the UE mobility is handled in a core network tracking area level and the UE context is stored in the core network. In the INACTIVE mode, the UE mobility is handled in a RAN area level and the UE context is stored in the RAN—the core network does not know if the UE is in CONNECTED or INACTIVE mode at a given time. The gNB 170 sends system information in step 4, which includes EDT configuration. As is known, EDT is a mechanism for data transmission, e.g., of infrequent small data packet transmissions, during a random-access procedure.

In step 5, the UE determines that data is available for transmission. In step 6, the UE 110 determines that the next PCG occasion is after 2s (two seconds). Because this is less than the three second time threshold received in step 2, the UE 110 determines in step 7 that PCG shall be used according to the information received in step 2. The UE 110 performs the PCG transmission, in conjunction with the gNB 170, in step 8 at the scheduled PCG occasion.

Steps 9-12 illustrate a different possibility. In these steps, the UE determines based on the three second time threshold to perform an SDT transmission, e.g., using the EDT configuration received in step 4. A regular connection establishment may also be performed, e.g., using RRC Setup/Resume signaling. In step 9, the UE determines that data becomes available for transmission. In step 10, the UE determines that the next PCG occasion is after four seconds (4s) from a current time. In step 11, the UE 110 determines that SDT/regular connection establishment shall be used according to information received in step 2. That is, the four seconds is greater that the time threshold of three seconds, meaning that SDT (or regular connection establishment) should be used. In this example, the SDT (e.g., or regular connection establishment) is performed in step 12.

It should be noted that the UE may remain in an idle or inactive state for certain transmissions or may transit to the connected state. This can depend, for instance, on what the network decides to do. In case of regular connection establishment, the connected state is used in order for the data can be transmitted, however.

Figure 3:
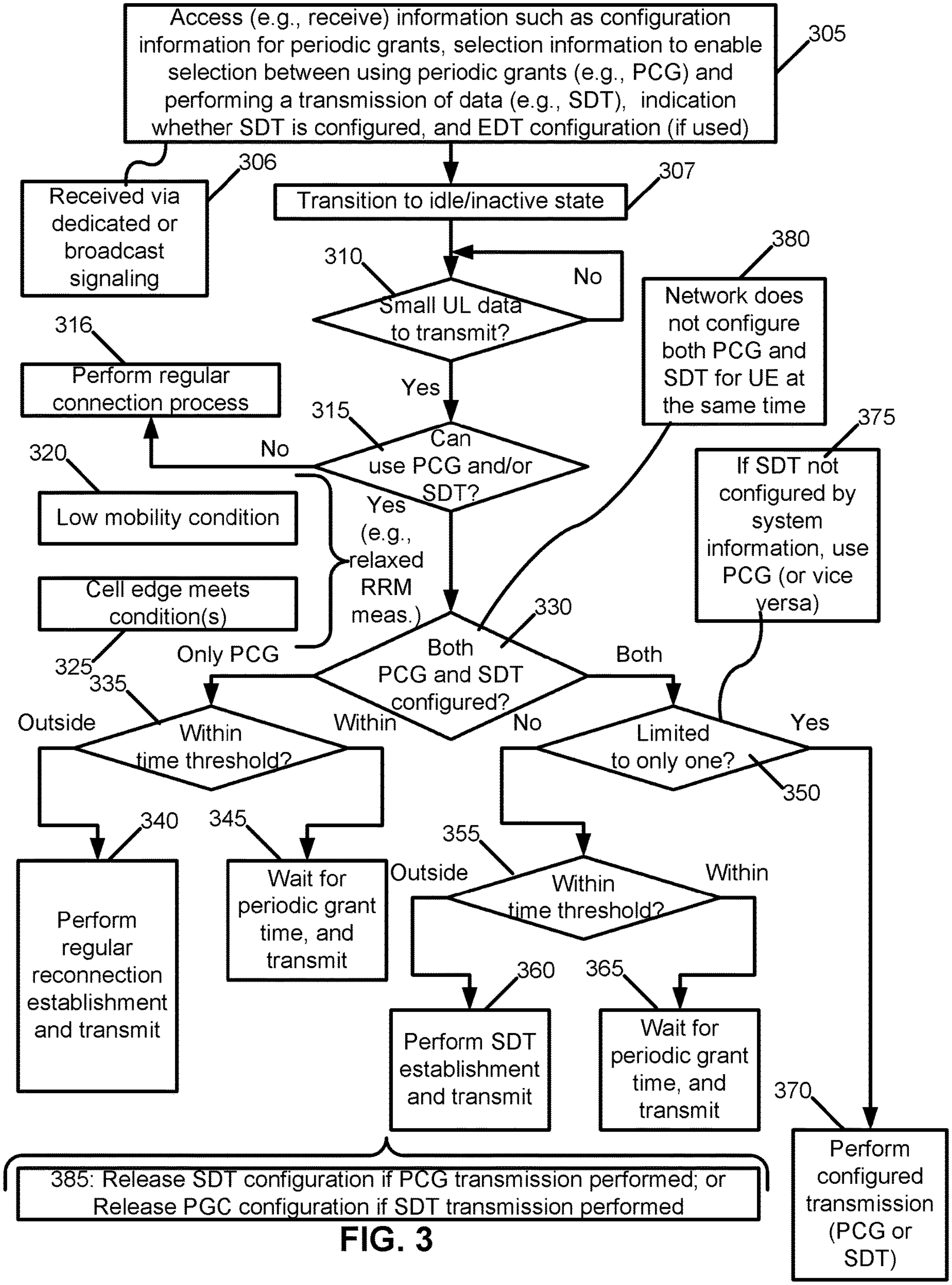
FIG. 3 is a logic flow diagram performed by a user equipment for a selection mechanism and use of multiple UL transmission schemes such as SDT or PCG, in accordance with exemplary embodiments herein.

Turning to FIG. 3, this figure is a logic flow diagram performed by a user equipment for a selection mechanism and use of multiple UL transmission schemes such as SDT or PCG, in accordance with exemplary embodiments herein. This figure also illustrates the operation of an exemplary method or methods, a result of execution of computer program instructions embodied on a computer readable memory, functions performed by logic implemented in hardware, and/or interconnected means for performing functions in accordance with exemplary embodiments. The UE 110 performs the blocks in FIG. 3 under control, at least in part, of control module 140. FIG. 3 is an illustration of a mechanism for selection of a UL transmission scheme in different scenarios. The UL transmission schemes are a regular (re) connection, SDT, or PCG, in this example.

In block 305, the UE 110 accesses (e.g., receives) information such as configuration information for periodic grants, selection information to enable selection between using periodic grants (e.g., PCG) and performing a transmission of data (e.g., SDT), indication whether SDT is configured, and EDT configuration (if used). It is noted that this information can be received in one or multiple signaling communications.

The information can be provided, e.g., via broadcast and/or dedicated signaling. See block 306. In one example, information can be statically specified in the specification, i.e., there would not be any signaling. In another example, some information can be provided while other information can be specified, e.g., by a specification. The selection information can include, e.g., data amount and/or time thresholds for at least one UL transmission scheme, and the like.

The selection information to enable selection between PCG and SDT can be a time threshold as illustrated in FIG. 2, and this is the example used below. However, another option to choose between PCG or SDT could be the payload size that can be carried in PCG or SDT, and the UE would select the PCG/SDT based on the payload size the UE needs to transmit. For instance, the UE selects the smallest/biggest resource where the payload fits, and the like. In this latter example, the selection information would not be a time threshold but would instead be an indication the UE is to choose between PCG or SDT based on the payload size.

At some point, in block 307, there is a transition by the UE 110 to an idle/inactive state. The UE waits until there is small amount of UL data to transmit. In this case, this example is for "small" data transmissions. The determination of a "small" amount of data could be either UE implementation or a threshold (or multiple ones for at least one resource) that is defined/configured, based on which the UE evaluates. It is assumed that an amount of data above what is considered to be a "small" amount of data would cause a regular connection to be made. If there is no small UL data to transmit (block 310=No), the UE waits until there is UL data to transmit (block 310=Yes).

Once there is a small amount of UL data to transmit, the UE determines whether PCG and/or SDT can be used (e.g., based on the configuration received in block 305). The PCG and SDT are two examples of UL transmission schemes. If the UE can use PCG and/or SDT (block 315=Yes), the flow proceeds to block 330. If there is data to transmit and neither PCG nor SDT may be used, the UE could perform a regular connection, which is another possible UL transmission scheme. See block 316. The regular connection process may be, e.g., RRC Setup/Resume. Also, the difference between using either a regular connection process for transmission or a PCG/SDT transmission could be based on, e.g., a threshold as previously described.

The use of PCG and/or SDT may be applicable when the UE is allowed to perform relaxed RRM measurements. In one example, the UE can use PCG and/or SDT (e.g., block 315=Yes) if there is a low mobility condition (block 320). As another example, the UE can use PCG and/or SDT if a cell edge condition meets a certain condition (or conditions) (block 325). The measurements can be relaxed in time and/or frequency domain, i.e., less often or over fewer frequencies/cells than normal measurements.

For instance, if the UE is not at a cell edge, the UE may be allowed to use SDT and/or PCG. These are not the only possible conditions, but here the relaxed RRM measurements would be used as the condition. To enable these, the UE is configured such that the PCG/SDT can be used when relaxed RRM measurements would be used. This configuration could be indicated by a flag in the SDT/PCG configuration. Alternatively, it may be defined in a specification that when SDT/PCG is configured and relaxed RRM measurements are allowed, and the UE can use those resources as well.

Note that the UE in block 315 can determine that the UE has been configured with SDT/PCG. If this is the case, the UE would be allowed also to use SDT/PCG.

In block 330, the UE determines whether both PCG and SDT are configured, where the configuration is from block 305. If PCG is configured (block 330=PCG), the flow proceeds to block 335, where the UE 110 determines whether the current time is within a time threshold. For instance, in FIG. 2, the threshold was three seconds. The time threshold can be, e.g., time in seconds, frames, subframes, slots, TTIs, or the like. If the UE is outside the time threshold (meaning, e.g., the current time until the time the PCG occasion starts is larger than the threshold) (block 335=Outside), the UE performs regular reconnection establishment and transmits the UL data in block 340. The regular connection reestablishment may be, e.g., RRC Setup/Resume. If a next transmission occasion is far enough in time from a current time, data can be transmitted quicker using a regular connection. This is why a regular connection is used in Block 340.

By contrast, if the UE 110 is within the time threshold (meaning, e.g., the current time until the time the PCG occasion starts is less than the threshold) (block 335=Within), the UE waits for the periodic grant time of the PCG occasion, and transmits the UL data in the PCG occasion in block 345.

If both the PCG and the SDT are configured (block 330=both), the flow proceeds to block 350, where the UE 110 determines whether transmissions are limited to one of these. The configuration can be determined from the information accessed (e.g., received) in block 305.

If the UE is not limited to one (block 350=No), the UE in block 355 determines whether the current time is within the time threshold. For instance, in FIG. 2, the threshold was three seconds. The time threshold can be, e.g., time in seconds, frames, subframes, slots, TTIs, or the like. If the UE is outside the time threshold (meaning, e.g., the current time until the PCG occasion starts is larger than the threshold) (block 355=Outside), the UE performs SDT reconnection establishment and transmits the UL data in block 360. Note that the SDT reconnection establishment and transmission may use using EDT configuration in an exemplary embodiment. It is noted, however, that SDT is yet to be completely defined for NR and may later have some differences with EDT. For instance, SDT may be assigned to a dedicated UE in which case no dedicated UE identification is needed for the connection establishment as compared with regular connection establishment.

By contrast, if the UE 110 is within the time threshold (meaning, e.g., the current time until the PCG occasion starts is less than the threshold) (block 355=Within), the UE waits for the periodic grant time of the PCG occasion, and transmits the UL data in the PCG occasion in block 365.

In block 350, if the UE is limited to one of PCG or SDT (block 350=Yes), the flow proceeds to block 370. In this block, the UE performs the configured transmission, either PCG, using a PCG occasion, or SDT.

As previously described, the UE uses PCG instead of SDT and in one option, this can be conditioned for SDT being configured via system information. That is, if SDT is not configured by dedicated signaling, the UE uses PCG (if so configured) and does not use SDT. This is illustrated by block 375, where if the SDT is not configured by system information (and corresponding dedicated signaling), the UE uses PCG and not SDT.

In more detail, both SDT/PCG could be configured either with dedicated or broadcast signaling, and the idea is that the dedicated signaling option takes precedence. But it could be also other way around (i.e., broadcast configuration takes precedence).

In one embodiment, the network should not configure both SDT and PCG at substantially the same time for the UE. See block 380. In another exemplary embodiment, the UE releases its PCG configuration if the UE performs SDT transmission. See block 385. Alternatively, the UE releases its SDT configuration if the UE performs PCG transmission. See block 385. Block 385 can depend from blocks 345, 360, or 365.

Figure 4:
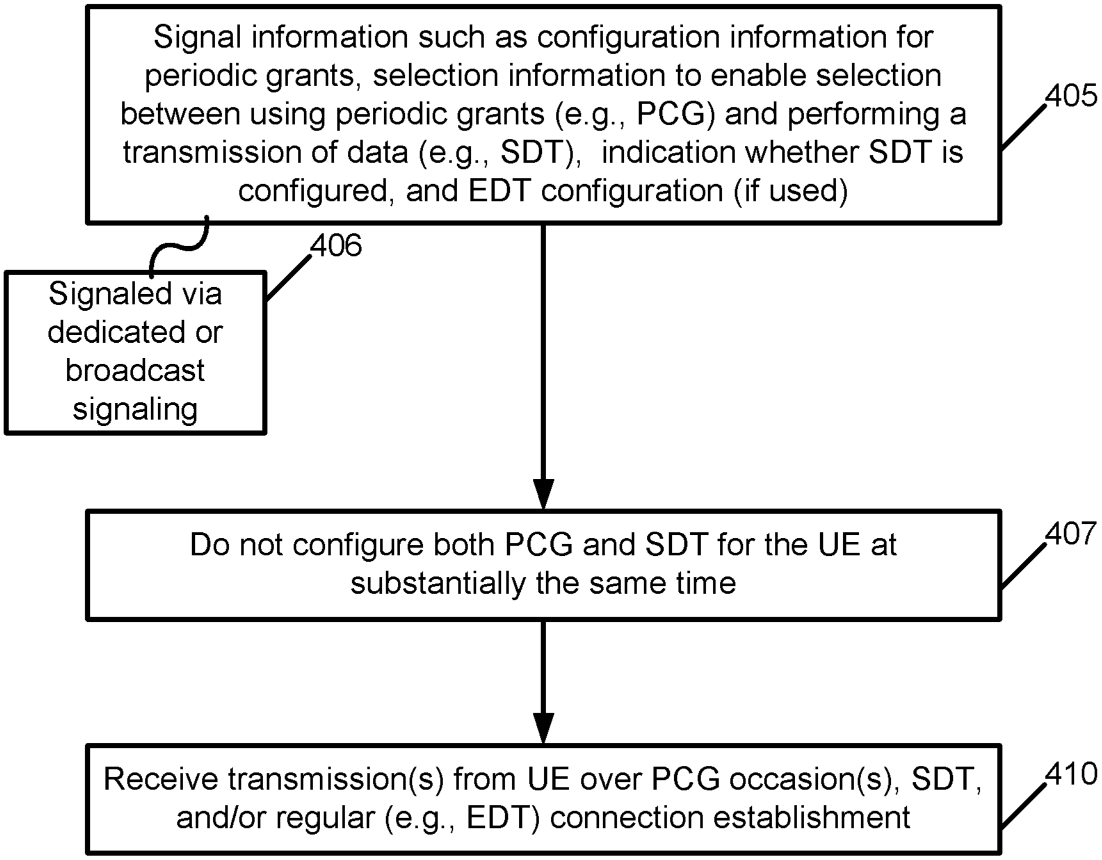
FIG. 4 is a logic flow diagram performed by a network access node for a selection mechanism and use of multiple UL transmission schemes such as SDT or PCG, in accordance with exemplary embodiments herein.

Turning to FIG. 4, this figure is a logic flow diagram performed by a network access node for a selection mechanism and use of multiple UL transmission schemes such as SDT or PCG, in accordance with exemplary embodiments herein. This figure also illustrates the operation of an exemplary method or methods, a result of execution of computer program instructions embodied on a computer readable memory, functions performed by logic implemented in hardware, and/or interconnected means for performing functions in accordance with exemplary embodiments. The network access node is a RAN node 170 in this embodiment, and the RAN node performs the blocks in FIG. 4 under control, at least in part, of control module 150.

In block 405, the RAN node 170 signals information such as configuration information for periodic grants, selection information to enable selection between using periodic grants (e.g., PCG) and performing a transmission of data (e.g., SDT), indication whether SDT is configured, and EDT configuration (if used). It is noted that this configuration can be signaled in one or multiple signaling communications. The information can be provided, e.g., via broadcast and/or dedicated signaling. See block 406. In block 407, which is similar to block 380 of FIG. 3, the network does not configure both PCG and SDT for the UE at substantially the same time. That is, the network configures one of the PCG or SDT for the UE at substantially the same time. Note that there could be overlap while there is a changeover. For instance, if the UE is configured for PCG, and the network will change over to SDT for this UE, the RAN node 170 might configure the UE with SDT and then remove the configuration for the UE for PCG. Alternatively, the RAN node 170 could remove the configuration for PCG and then add in the configuration for SDT. It might also be possible for the network to signal removal of PCG and addition of SDT at substantially the same time, e.g., in one message. In block 410, the RAN node 170 receives transmission(s) from the UE over PCG occasion(s), SDT, and/or regular (e.g., EDT) connection establishment.

The Following are Additional Examples.

Example 1. A method, comprising:

by a user equipment in an inactive or idle state and in response to having uplink data that is to be transmitted, selecting which one of multiple uplink transmission schemes should be used to transmit the uplink data, wherein the multiple uplink transmission schemes comprise a regular connection establishment, a small data transmission, or a preconfigured grant; and performing the selected uplink transmission scheme to transmit the uplink data.

Example 2. The method according to example 1, wherein both the preconfigured grant and small data transmission are configured for the user equipment, and wherein:

selecting further comprises selecting the small data transmission in response to a current time being outside a time threshold to a time for a grant occasion for the preconfigured grant and performing the selected uplink transmission scheme further comprises performing the regular connection establishment to transmit the small amount of uplink data; or selecting further comprises selecting the preconfigured grant in response to a current time being inside the time threshold to the time for the grant occasion for the preconfigured grant and performing the selected uplink transmission scheme further comprises performing the preconfigured grant using the grant occasion to transmit the small amount of uplink data.

Example 3. The method according to example 1, wherein both the preconfigured grant and small data transmission are configured for the user equipment, but one of the preconfigured grant or small data transmission is to be used by the user equipment, and wherein:

selecting further comprises selecting whichever one of the preconfigured grant or small data transmission is to be used by the user equipment and performing the selected uplink transmission scheme further comprises performing the one of the preconfigured grant or small data transmission that is to be used by the user equipment to transmit the small amount of uplink data.

Example 4. The method according to example 3, wherein in response to one of the preconfigured grant or small data transmission being configured with a first type of signaling and the other of the preconfigured grant or small data transmission being configured with a second type of signaling, selecting the one of the preconfigured grant or small data transmission that is configured with the first type of signaling as the one of the preconfigured grant or small data transmission that is to be used by the user equipment.

Example 5. The method according to example 4, wherein the first type of signaling is dedicated signaling and the second type of signaling is broadcast signaling.

Example 6. The method according to example 4, wherein the first type of signaling is broadcast signaling and the second type of signaling is dedicated signaling.

Example 7. The method according to example 1, wherein one of the preconfigured grant scheme or the small data transmission uplink transmission scheme is configured for the user equipment at a time.

Example 8. The method according to any one of examples 1 to 7, wherein one of the preconfigured grant or small data transmission is selected and transmission is performed using the selected one of the preconfigured grant or small data transmission, and the method further comprises releasing by the user equipment configuration for the one of the preconfigured grant or small data transmission that was not selected.

Example 9. The method according to any one of examples 1 to 8, wherein a small data transmission is performed using an early data transmission that uses a random access channel procedure.

Example 10. The method according to any one of examples 1 to 9, wherein the regular connection establishment comprises one or more of the following: a radio resource control connection setup procedure; a radio resource control connection resume procedure; or a radio resource control connection re-establishment procedure.

Example 11. The method according to any one of examples 1 to 9, wherein selecting comprises the user equipment selecting to use a small data transmission or preconfigured grant in response to the user equipment being allowed to perform radio resource measurements according to one or both of the following conditions:

a low mobility condition is used for determining whether small data transmission or preconfigured grant or both are allowed; or a cell edge condition is used for determining whether small data transmission or preconfigured grant or both are allowed.

Example 12. The method according to example 11, wherein, in response to the user equipment being determined to having a low mobility, the user equipment is allowed to use small data transmission or preconfigured grant or both.

Example 13. The method according to any one of examples 11 or 12, wherein, in response to the user equipment being determined meet a cell edge condition, the user equipment is allowed to use small data transmission or preconfigured grant or both.

Example 14. The method according to example 1, wherein neither a preconfigured grant nor a small data transmission is configured for the user equipment, and wherein:

selecting further comprises selecting the regular connection establishment and performing the selected uplink transmission scheme further comprises performing the regular connection establishment to transmit the uplink data.

Example 15. The method according to example 1, wherein a preconfigured grant is configured for the user equipment but small data transmission is not configured for the user equipment, and wherein:

selecting further comprises selecting the regular connection establishment in response to a current time being outside a time threshold to a time for a grant occasion for the preconfigured grant and performing the selected uplink transmission scheme further comprises performing the regular connection establishment to transmit the small amount of uplink data; or selecting further comprises selecting the preconfigured grant in response to a current time being inside the time threshold to the time for the grant occasion for the preconfigured grant and performing the selected uplink transmission scheme further comprises performing the preconfigured grant using the grant occasion to transmit the small amount of uplink data.

Example 16. The method according to any one of examples 1 to 15, wherein the uplink data is an amount of data that is determined to be small based on implementation in the user equipment or a received threshold based on which the user equipment evaluates to determine whether the amount of data is small.

Example 17. The method according to any one of examples 1 to 16, wherein the selecting is based on received information, and the received information comprises one or both of data amount or time thresholds for one or more of the multiple uplink transmission schemes.

Example 18. The method according to example 17, wherein the method further comprises receiving the received information via one or both of dedicated signaling or broadcast signaling.

Example 19. The method according to example 18, wherein the dedicated signaling comprises one or more radio resource control release messages or the broadcast signaling comprises system information block signaling.

Example 20. A method, comprising:

sending, from a network node to a user equipment, information configured to allow the user equipment to select which one of multiple uplink transmission schemes should be used to transmit uplink data, wherein the multiple uplink transmission schemes comprise a regular connection establishment, a small data transmission, or a preconfigured grant; and receiving by the network uplink data transmitted by the user equipment using the selected uplink transmission scheme.

Example 21. The method according to example 20, wherein the network node does not configure both the small data transmission and preconfigured grant for the user equipment at substantially a same time.

Example 22. The method according to example 20, wherein sending the information comprises configuring one of the preconfigured grant or small data transmission with a first type of signaling and the other of the preconfigured grant or small data transmission being configured with a second type of signaling.

Example 23. The method according to example 22, wherein the first type of signaling is dedicated signaling and the second type of signaling is broadcast signaling.

Example 24. The method according to example 22, wherein the first type of signaling is broadcast signaling and the second type of signaling is dedicated signaling.

Example 25. The method according to any one of examples 20 to 24, wherein receiving comprises receiving a small data transmission that uses an early data transmission that uses a random access channel procedure.

Example 26. The method according to any one of examples 20 to 25, wherein the regular connection establishment comprises one or more of the following: a radio resource control connection setup procedure; a radio resource control connection resume procedure; or a radio resource control connection re-establishment procedure.

Example 27. The method according to any one of examples 20 to 26, wherein the sent information comprises one or both of data amount or time threshold for one or more of the multiple uplink transmission schemes.

Example 28. The method according to example 27, wherein the sending the information further comprises sending the information via one or both of dedicated signaling or broadcast signaling.

Example 29. The method according to example 28, wherein the dedicated signaling comprises one or more radio resource control release messages or the broadcast signaling comprises system information block signaling.

Example 30. A computer program, comprising code for performing the methods of any one of examples 1 to 29, when the computer program is run on a computer.

Example 31. The computer program according to example 30, wherein the computer program is a computer program product comprising a computer-readable medium bearing computer program code embodied therein for use with the computer.

Example 32. The computer program according to example 30, wherein the computer program is directly loadable into an internal memory of the computer.

Example 33. An apparatus comprising means for performing:

by a user equipment in an inactive or idle state and in response to having uplink data that is to be transmitted, selecting which one of multiple uplink transmission schemes should be used to transmit the uplink data, wherein the multiple uplink transmission schemes comprise a regular connection establishment, a small data transmission, or a preconfigured grant; and performing the selected uplink transmission scheme to transmit the uplink data.

Example 34. The apparatus according to example 33, wherein both the preconfigured grant and small data transmission are configured for the user equipment, and wherein:

selecting further comprises selecting the small data transmission in response to a current time being outside a time threshold to a time for a grant occasion for the preconfigured grant and performing the selected uplink transmission scheme further comprises performing the regular connection establishment to transmit the small amount of uplink data; or selecting further comprises selecting the preconfigured grant in response to a current time being inside the time threshold to the time for the grant occasion for the preconfigured grant and performing the selected uplink transmission scheme further comprises performing the preconfigured grant using the grant occasion to transmit the small amount of uplink data.

Example 35. The apparatus according to example 33, wherein both the preconfigured grant and small data transmission are configured for the user equipment, but one of the preconfigured grant or small data transmission is to be used by the user equipment, and wherein:

selecting further comprises selecting whichever one of the preconfigured grant or small data transmission is to be used by the user equipment and performing the selected uplink transmission scheme further comprises performing the one of the preconfigured grant or small data transmission that is to be used by the user equipment to transmit the small amount of uplink data.

Example 36. The apparatus according to example 35, wherein in response to one of the preconfigured grant or small data transmission being configured with a first type of signaling and the other of the preconfigured grant or small data transmission being configured with a second type of signaling, selecting the one of the preconfigured grant or small data transmission that is configured with the first type of signaling as the one of the preconfigured grant or small data transmission that is to be used by the user equipment.

Example 37. The apparatus according to example 36, wherein the first type of signaling is dedicated signaling and the second type of signaling is broadcast signaling.

Example 38. The apparatus according to example 36, wherein the first type of signaling is broadcast signaling and the second type of signaling is dedicated signaling.

Example 39. The apparatus according to example 33, wherein one of the preconfigured grant scheme or the small data transmission uplink transmission scheme is configured for the user equipment at a time.

Example 40. The apparatus according to any one of examples 33 to 39, wherein one of the preconfigured grant or small data transmission is selected and transmission is performed using the selected one of the preconfigured grant or small data transmission, and the apparatus further comprises means for releasing by the user equipment configuration for the one of the preconfigured grant or small data transmission that was not selected.

Example 41. The apparatus according to any one of examples 33 to 40, wherein a small data transmission is performed using an early data transmission that uses a random access channel procedure.

Example 42. The apparatus according to any one of examples 33 to 41, wherein the regular connection establishment comprises one or more of the following: a radio resource control connection setup procedure; a radio resource control connection resume procedure; or a radio resource control connection re-establishment procedure.

Example 43. The apparatus according to any one of examples 33 to 41, wherein selecting comprises the user equipment selecting to use a small data transmission or preconfigured grant in response to the user equipment being allowed to perform radio resource measurements according to one or both of the following conditions:

a low mobility condition is used for determining whether small data transmission or preconfigured grant or both are allowed; or a cell edge condition is used for determining whether small data transmission or preconfigured grant or both are allowed.

Example 44. The apparatus according to example 43, wherein, in response to the user equipment being determined to having a low mobility, the user equipment is allowed to use small data transmission or preconfigured grant or both.

Example 45. The apparatus according to any one of examples 43 or 44, wherein, in response to the user equipment being determined meet a cell edge condition, the user equipment is allowed to use small data transmission or preconfigured grant or both.

Example 46. The apparatus according to example 33, wherein neither a preconfigured grant nor a small data transmission is configured for the user equipment, and wherein:

selecting further comprises selecting the regular connection establishment and performing the selected uplink transmission scheme further comprises performing the regular connection establishment to transmit the uplink data.

Example 47. The apparatus according to example 33, wherein a preconfigured grant is configured for the user equipment but small data transmission is not configured for the user equipment, and wherein:

selecting further comprises selecting the regular connection establishment in response to a current time being outside a time threshold to a time for a grant occasion for the preconfigured grant and performing the selected uplink transmission scheme further comprises performing the regular connection establishment to transmit the small amount of uplink data; or selecting further comprises selecting the preconfigured grant in response to a current time being inside the time threshold to the time for the grant occasion for the preconfigured grant and performing the selected uplink transmission scheme further comprises performing the preconfigured grant using the grant occasion to transmit the small amount of uplink data.

Example 48. The apparatus according to any one of examples 33 to 47, wherein the uplink data is an amount of data that is determined to be small based on implementation in the user equipment or a received threshold based on which the user equipment evaluates to determine whether the amount of data is small.

Example 49. The apparatus according to any one of examples 33 to 48, wherein the selecting is based on received information, and the received information comprises one or both of data amount or time thresholds for one or more of the multiple uplink transmission schemes.

Example 50. The apparatus according to example 49, wherein the apparatus further comprises means for receiving the received information via one or both of dedicated signaling or broadcast signaling.

Example 51. The apparatus according to example 50, wherein the dedicated signaling comprises one or more radio resource control release messages or the broadcast signaling comprises system information block signaling.

Example 52. A user equipment comprising the apparatus of any one of examples 33 to 51.

Example 53. An apparatus comprising means for performing:

sending, from a network node to a user equipment, information configured to allow the user equipment to select which one of multiple uplink transmission schemes should be used to transmit uplink data, wherein the multiple uplink transmission schemes comprise a regular connection establishment, a small data transmission, or a preconfigured grant; and receiving by the network uplink data transmitted by the user equipment using the selected uplink transmission scheme.

Example 54. The apparatus according to example 53, wherein the network node does not configure both the small data transmission and preconfigured grant for the user equipment at the substantially a same time.

Example 55. The apparatus according to example 53, wherein sending the information comprises configuring one of the preconfigured grant or small data transmission with a first type of signaling and the other of the preconfigured grant or small data transmission being configured with a second type of signaling.

Example 56. The apparatus according to example 54, wherein the first type of signaling is dedicated signaling and the second type of signaling is broadcast signaling.

Example 57. The apparatus according to example 56, wherein the first type of signaling is broadcast signaling and the second type of signaling is dedicated signaling.

Example 58. The apparatus according to any one of examples 53 to 57, wherein receiving comprises receiving a small data transmission that uses an early data transmission that uses a random access channel procedure.

Example 59. The apparatus according to any one of examples 53 to 58, wherein the regular connection establishment comprises one or more of the following: a radio resource control connection setup procedure; a radio resource control connection resume procedure; or a radio resource control connection re-establishment procedure.

Example 60. The apparatus according to any one of examples 53 to 59, wherein the sent information comprises one or both of data amount or time thresholds for one or more of the multiple uplink transmission schemes.

Example 61. The apparatus according to example 60, wherein the sending the information further comprises sending the information via one or both of dedicated signaling or broadcast signaling.

Example 62. The apparatus according to example 61, wherein the dedicated signaling comprises one or more radio resource control release messages or the broadcast signaling comprises system information block signaling.

Example 63. The apparatus of any one of examples 53 to 62, wherein the means comprises:

at least one processor; and at least one memory including computer program code, the at least one memory and computer program code configured to, with the at least one processor, cause the performance of the apparatus.

Example 64. A network access node comprising the apparatus of any one of examples 53 to 62.

Example 65. A system comprising the apparatus of any one of examples 33 to 51 and the apparatus of any one of examples 53 to 63.

Example 66. An apparatus, comprising:

one or more processors; and one or more memories including computer program code, wherein the one or more memories and the computer program code are configured, with the one or more processors, to cause the apparatus to:

by a user equipment in an inactive or idle state and in response to having uplink data that is to be transmitted, select which one of multiple uplink transmission schemes should be used to transmit the uplink data, wherein the multiple uplink transmission schemes comprise a regular connection establishment, a small data transmission, or a preconfigured grant; and perform the selected uplink transmission scheme to transmit the uplink data.

Example 67. An apparatus, comprising:

one or more processors; and one or more memories including computer program code, wherein the one or more memories and the computer program code are configured, with the one or more processors, to cause the apparatus to:

send, from a network node to a user equipment, information configured to allow the user equipment to select which one of multiple uplink transmission schemes should be used to transmit uplink data, wherein the multiple uplink transmission schemes comprise a regular connection establishment, a small data transmission, or a preconfigured grant; and receive by the network uplink data transmitted by the user equipment using the selected uplink transmission scheme.

Without in any way limiting the scope, interpretation, or application of the claims appearing below, a technical effect and advantage of one or more of the example embodiments disclosed herein is deterministic UE behavior. Another technical effect and advantage is network control for UL transmission scheme selection.

As used in this application, the term "circuitry" may refer to one or more or all of the following:

(a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects are set out above, other aspects comprise other combinations of features from the described embodiments, and not solely the combinations described above.

It is also noted herein that while the above describes example embodiments of the invention, these descriptions should not be viewed in a limiting sense. Rather, there are several variations and modifications which may be made without departing from the scope of the present invention.

The following abbreviations that may be found in the specification and/or the drawing figures are defined as follows:

3GPP third generation partnership project
5G fifth generation
5GC 5G core network
AMF access and mobility management function
CU central unit
DCI Downlink Control Information
DU distributed unit
EDT early data transmission eNB (or eNodeB) evolved Node B (e.g., an LTE base station)
EN-DC E-UTRA-NR dual connectivity
en-gNB or En-gNB node providing NR user plane and control plane protocol terminations towards the UE, and acting as secondary node in EN-DC
E-UTRA evolved universal terrestrial radio access, i.e., the LTE radio access technology
gNB (or gNodeB) base station for 5G/NR, i.e., a node providing NR user plane and control plane protocol terminations towards the UE, and connected via the NG interface to the 5GC
I/F interface
LTE long term evolution
MAC medium access control
MME mobility management entity
ng or NG next generation
ng-eNB or NG-eNB next generation eNB
NR new radio
N/W or NW network
PCG Preconfigured Grant
PDCP packet data convergence protocol
PHY physical layer
PUR Periodic Uplink Resources
RAN radio access network
Rel release
RLC radio link control
RRH remote radio head
RRC radio resource control
RRM radio resource measurement
RU radio unit
Rx receiver
SDAP service data adaptation protocol
SDT Small Data Transmission
SGW serving gateway
SIB system information block
SMF session management function
TS technical specification
TTI transmission time interval
Tx transmitter
UE user equipment (e.g., a wireless, typically mobile device)
UPF user plane function
WI work item
WID work item description

What is claimed is:

1. A method for use in a user equipment, the method comprising:

selecting, while the user equipment is in an inactive state or an idle state, one of multiple uplink transmission schemes to be used to transmit uplink data, wherein the multiple uplink transmission schemes comprise a random access channel (RACH) procedure based small data transmission scheme and a preconfigured grant based uplink transmission scheme, wherein, in an instance in which the UE is configured with the preconfigured grant based uplink transmission scheme and the RACH procedure based small data transmission scheme, the selecting comprises selecting the preconfigured grant based uplink transmission scheme over the RACH procedure based small data transmission scheme, wherein, in an instance in which both the preconfigured grant based uplink transmission scheme and the RACH procedure based small data transmission scheme are configured for the user equipment the selecting further comprises one of:

selecting the RACH procedure based small data transmission scheme in response to a grant occasion for the preconfigured grant based uplink transmission scheme is more than a time threshold ahead and performing the selected uplink transmission scheme further comprises performing a RRC setup or resume procedure to transmit an amount of uplink data, or selecting the preconfigured grant based uplink transmission scheme in response to a grant occasion for the preconfigured grant based uplink transmission scheme is less than a time threshold ahead and performing the selected uplink transmission scheme further comprises performing the preconfigured grant based uplink transmission scheme using the grant occasion to transmit the amount of uplink data; and performing the selected uplink transmission scheme to transmit the uplink data.

2. The method of claim 1, wherein a small data transmission is performed using an early data transmission that uses a random access channel procedure.

3. The method of claim 1, wherein the uplink data is an amount of data that is determined to be small based on one of:

implementation in the user equipment, or a received threshold, which the user equipment uses to determine whether the amount of data is small.

4. The method of claim 1, wherein the selecting is based on received information, and wherein the received information comprises one or both of; data amount thresholds or time thresholds for one or more of the multiple uplink transmission schemes.

5. The method of claim 4, further comprises:

receiving the received information via one or both of dedicated signaling or broadcast signaling.

6. The method of claim 5, wherein the dedicated signaling comprises one or more radio resource control release messages, or wherein the broadcast signaling comprises system information block signaling.

7. The method of claim 1, wherein the multiple uplink transmission schemes further comprise an uplink transmission scheme performed via a radio the RRC setup or resume procedure.

8. The method of claim 7, wherein one of the preconfigured grant based uplink transmission scheme or the RACH procedure based small data transmission scheme is selected and transmission is performed using the selected one of the preconfigured grant based uplink transmission scheme or the RACH procedure based small data transmission scheme, and wherein the method further comprises releasing, by the user equipment, a configuration for the one of the preconfigured grant based uplink transmission scheme or the RACH procedure based small data transmission scheme that was not selected.

9. The method of claim 7, wherein the RRC setup or resume procedure comprises one or more of: a radio resource control connection setup procedure, a radio resource control connection resume procedure, or a radio resource control connection re-establishment procedure.

10. The method of claim 7, wherein when both the preconfigured grant based uplink transmission scheme and the RACH procedure based small data transmission scheme are configured for the UE, selecting further comprises selecting the RACH procedure based small data transmission scheme in response to a grant occasion for the preconfigured grant based uplink transmission scheme is more than a time threshold ahead and performing the selected uplink transmission scheme further comprises performing the RRC setup or resume procedure to transmit an amount of uplink data; or selecting further comprises selecting the preconfigured grant based uplink transmission scheme in response to a grant occasion for the preconfigured grant based uplink transmission scheme is less than a time threshold ahead and performing the selected uplink transmission scheme further comprises performing the preconfigured grant based uplink transmission scheme using the grant occasion to transmit the amount of uplink data.

11. A user equipment (UE) comprising:

one or more processors; and one or more memories comprising computer program codes stored therein that, when executed by the one or more processors, cause the UE to perform:

selecting, while the UE is in an inactive state or an idle state, one of multiple uplink transmission schemes to be used to transmit uplink data, wherein the multiple uplink transmission schemes comprise a random access channel (RACH) procedure based small data transmission scheme and a preconfigured grant based small data transmission scheme, wherein, in an instance in which the UE is configured with the preconfigured grant based uplink transmission scheme and the RACH procedure based small data transmission scheme, the selecting comprises selecting the preconfigured grant based uplink transmission scheme over the RACH procedure based small data transmission scheme, wherein, in an instance in which both the preconfigured grant based uplink transmission scheme and the RACH procedure based small data transmission scheme are configured for the UE, the selecting further comprises one of:

selecting the RACH procedure based small data transmission scheme in response to a grant occasion for the preconfigured grant based uplink transmission scheme is more than a time threshold ahead and performing the selected uplink transmission scheme further comprises performing a RRC setup or resume procedure to transmit an amount of uplink data, or selecting the preconfigured grant based uplink transmission scheme in response to a grant occasion for the preconfigured grant based uplink transmission scheme is less than a time threshold ahead and performing the selected uplink transmission scheme further comprises performing the preconfigured grant based uplink transmission scheme using the grant occasion to transmit the amount of uplink data; and performing the selected uplink transmission scheme to transmit the uplink data.

12. The UE of claim 11, wherein one of the preconfigured grant based uplink transmission scheme or the RACH procedure based small data transmission scheme is performed using the selected one of the preconfigured grant based uplink transmission scheme or the RACH procedure based small data transmission scheme, and wherein the computer program codes stored in the one or more memories, when executed by the one or more processors, further cause the UE to perform releasing, by the UE, a configuration for the one of the preconfigured grant based uplink transmission scheme or the RACH procedure based small data transmission scheme that was not selected.

13. The UE of claim 11, wherein a small data transmission is performed using an early data transmission that uses a random access channel procedure.

14. The UE of claim 11, wherein the one or more memories and the computer program code are further configured, with the one or more processors, to cause the UE to receive received information via one or both of dedicated signaling or broadcast signaling.

15. The UE of claim 14, wherein the dedicated signaling comprises one or more radio resource control release messages or the broadcast signaling comprises system information block signaling.

16. The UE of claim 11, wherein the multiple uplink transmission schemes further comprise an uplink transmission scheme performed via the RRC setup or resume procedure.

17. The UE of claim 16, wherein the RRC setup or resume procedure comprises one or more of the following: a radio resource control connection setup procedure; a radio resource control connection resume procedure; or a radio resource control connection re-establishment procedure.

18. The UE of claim 16, wherein neither the preconfigured grant based uplink transmission scheme nor the RACH procedure based small data transmission scheme is configured for the UE, and wherein:

selecting further comprises selecting the RRC setup or resume procedure and performing the selected uplink transmission scheme further comprises performing the RRC setup or resume procedure to transmit the uplink data.

19. The UE of claim 16, wherein the preconfigured grant based uplink transmission scheme is configured for the UE but the RACH procedure based small data transmission scheme is not configured for the UE, and wherein:

selecting further comprises selecting the RRC setup or resume procedure in response to a grant occasion for the preconfigured grant based uplink transmission scheme is more than a time threshold ahead and performing the selected uplink transmission scheme further comprises performing the RRC setup or resume procedure to transmit the amount of the uplink data; or selecting further comprises selecting the preconfigured grant based uplink transmission scheme in response to a grant occasion for the preconfigured grant based uplink transmission scheme is less than a time threshold ahead and performing the selected uplink transmission scheme further comprises performing the preconfigured grant based uplink transmission scheme using the grant occasion to transmit the amount of the uplink data.

* * * * *